Figure 1:
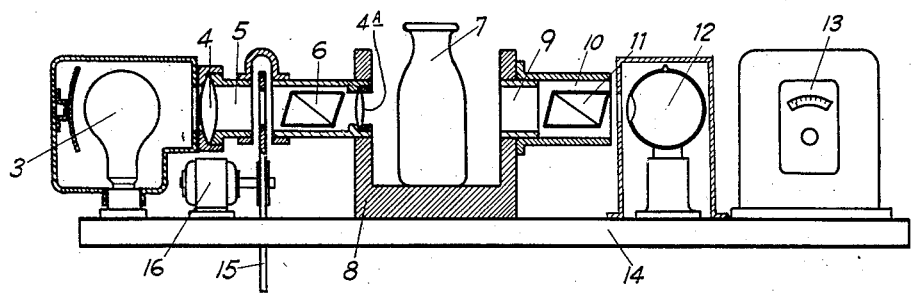

Nov. 7, 1933. R. S. GLASGOW ET AL 1,934,187
ELECTRICAL MEANS FOR TESTING TRANSLUCENT MATERIALS

Filed Dec. 26, 1930

INVENTORS
ALEXANDER L. DUVAL D'ADRIAN &
BY ROY S. GLASGOW

Eilers + Schaumberg
ATTORNEYS

Patented Nov. 7, 1933

1,934,187

UNITED STATES PATENT OFFICE 1,934,187

ELECTRICAL MEANS FOR TESTING TRANSLUCENT MATERIALS

Roy S. Glasgow and Alexander L. Duval d'Adrian, St. Louis, Mo.

Application December 26, 1930
Serial No. 504,980

4 Claims. (Cl. 88—14)

This invention relates to electrical means for testing translucent materials, and more particularly to a device for effecting automatic determinations of internal conditions existing in translucent materials. The disclosure includes a description of an application of the invention for testing the annealed condition of glass.

It is recognized in the art that commercial forms of glass, such as glass vessels, require to be annealed soon after their formation to prevent the creation therein of internal strains.

As a method of examining glass for strains, an instrument known as the polariscope is sometimes used in the art. Under the polariscope, the article under test will display a variety of colors, ranging from a deep red to a green, to a greenish blue, or even white, the magnitude of the internal strains being estimated by the intensity of light, or color. It will therefore appear that the success of the heretofore prevailing methods of testing, depends in great measure on the ability of the human eye to distinguish between various shades and gradations of colors, and hence the ultimate success of such tests is highly subject to the personal equation. It is difficult in practice to find different individuals who would regard the magnitude of strains in the same way.

Generally expressed, therefore, the present invention has for an object, the provision of an electrical polariscope or indicator which serves to indicate in a uniform and positive manner, any undesirable internal condition in translucent material such as glass, or of certain solutions, and to indicate the degree of such condition, as by the deflection of a meter.

A further object of the invention is attained in the provision of a device for testing formed glass objects for internal strain, in which device the degree of such strain will be indicated positively and in a manner not subject to the errors of human observation attending the processes heretofore prevailing.

Yet another object of the invention is the provision of a device employing polarized light for indicating certain internal conditions in translucent material, and so arranged as to indicate, instantly, the internal condition, such as a strain existing in a glass article under test, without requiring the time incident to a careful inspection and close comparison such as is necessary when depending upon a color indication.

A further object of the invention, as perhaps is suggested by the foregoing, is attained in the provision of an automatic glass-testing device which, of itself, will provide a numerical reading proportionate to the degree of internal strain of the material under test, merely upon application of such material at a predetermined location in the apparatus.

Figure 2:
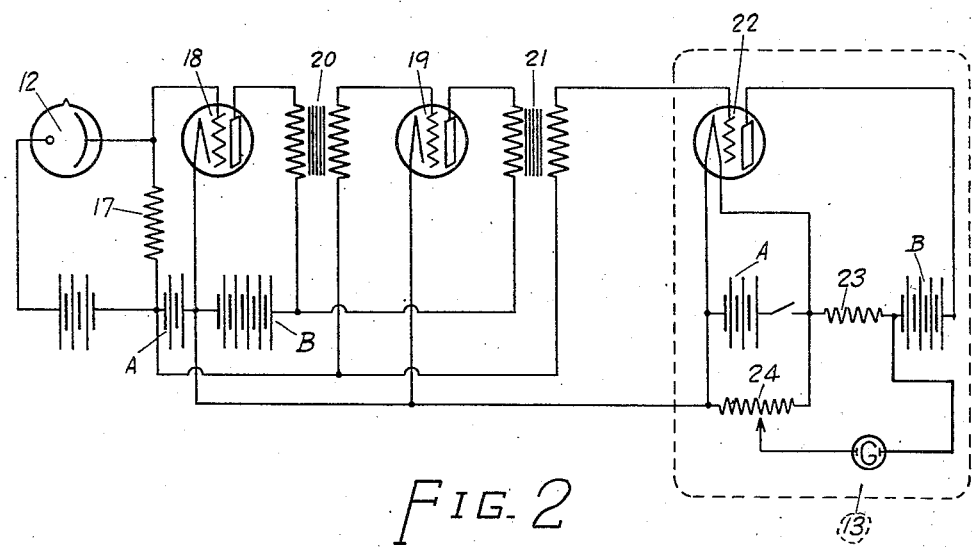

The foregoing and other objects will more fully appear as the description proceeds, and from the accompanying drawing illustrating a single preferred application of the invention to the testing of articles of glassware, such as bottles, in the drawing:

Fig. 1 is a side elevation of an assembly of the component items of apparatus preferably employed in execution of the ideas to be hereinafter described in more detail, certain of the apparatus being shown in section, and Fig. 2 is a circuit diagram of a light-responsive electrical metering arrangement employed in connection with the device of Fig. 1.

Referring now by characters of reference to the drawing, and more particularly to Fig. 1, a source of light, such as an electric lamp, is indicated at 3, and preferably so disposed that the light rays emanating therefrom are received and condensed by a suitable lens 4, disposed at one end of a mounting tube 5, near the opposite end of which is provided a polarizing prism 6, which may be fixed in position in the mounting tube. As shown in the drawing, the light source 3 may be suitably shielded. As indicated, an additional lens 4A may be disposed just beyond the polarizing prism, for purposes hereinafter appearing. The polarizing prism consists by preference of a Nicol prism, but may consist of any other suitable plane-polarizing medium. Immediately beyond the polarizing prism 6 and by preference in line with the mounting tube 5, is disposed the article or material under test, shown in the present case as a glass bottle 7, a support for which is provided at 8. Beyond this defined location of the substance to be tested, is disposed a second mounting tube, shown in the present instance as consisting of portions 9 and 10. In one of these portions, say in the member 10, is mounted a second prism in the nature of an analyzing prism and which may also consist of a Nicol element similar to that indicated at 6. The analyzer is shown at 11 and is mounted in one of the tube portions 9 or 10, preferably the latter, so as to be rotatable about the axis of mounting, for obviously necessary purposes of adjustment. If desired, the portion 8 may be provided, adjacent the tube member 10, with a suitable dial providing an indication of the degree of rotation of the analyzer 11. Disposed in line with and beyond the tube 10, and hence beyond the analyzer prism 11, is a light-responsive electrical device 12 which, by preference, consists of a photoelectric cell, the arrangement and construction of which are well known in the art. Since, as will hereinafter appear, the function of the device as an indicator is dependent upon the intensity of light to which the cell 12 is exposed, there is provided a metering arrangement for determining the voltage or current passing such cell, the arrangement consisting for present purposes of a meter indicated generally at 13, as will hereinafter appear. The various items of apparatus thus far described may be suitably disposed in line, and their space relations fixed by mounting thereof on a base such as 14.

Referring now briefly to the operation of the various elements described, to and including the photoelectric cell 12, it will be noted that the light rays from the source 3, as projected and condensed through the lens 4, pass through the polarizing prism 6, thence through the lens 4^A and the substance under test, being in the present case, the bottle 7, and thence through the analyzing prism 11, into the photoelectric cell. Before undertaking the test, the prisms are crossed, the mounting for one of the prisms, for example the analyzer 11, being so rotated that, until the substance under test is inserted in the light path, a minimum amount of light passes beyond the second prism. Upon application of the material under test, assuming it to be of predetermined internal characteristics, practically no polarized light will be passed through the second prism, since properly annealed glass, for example, is without any substantial effect in rotating the plane of polarization. Glass under internal strain, however, exhibits the effect of rotating the plane of polarization, and thus permits the apparatus to pass polarized light, in proportion to the magnitude of the internal strain existing in that portion of the substance between the prisms.

The result, obvious from the foregoing description, is that, in the case of a piece of glass under test, the greater the internal strain, the greater will be the intensity of light transmitted to the photoelectric cell. As is well known, when a photoelectric cell is illuminated, it becomes a conductor of current, and the conductivity of the cell increases in proportion to the illumination thereof. It will thus appear that by providing means for indicating the output of the photoelectric cell, a means is at once provided for indicating the internal condition of a translucent substance, such as a strain existing in an article of glassware. Such indicating means may assume the form of a meter 13, the deflection of which will provide the desired index on the characteristics of the material under test.

It will appear from the foregoing that the apparatus of the present invention may obviously be employed for the testing of liquids, such as certain solutions, in which case the support 8 would assume the form of a container. Where a solid substance is to be subjected to test, and the portion 8, a liquid containing vessel, certain advantages are obtained by immersing or filling the article with a liquid, preferably a liquid having an index of refraction approaching that of the substance under test. In the case of glassware, carbon tetrachloride has proven satisfactory as a means of preventing excess diffusion and loss of light as it passes between the polarizing and analyzing prisms.

Proceeding now to a description of the circuit relation by which the output of cell 12 is brought to be indicated, as by the meter 13, it will appear that since the current flowing in the photoelectric cell circuit will be a direct current of varying intensity, and unless provisions are made otherwise, a direct current amplifier would be desirably disposed in circuit between the cell and meter. As is known in the art, direct current amplifiers are somewhat difficult to balance and to be maintained in an operating condition over any period of time, due to the fact that slight changes in the filament current or plate potential, immediately serve to unbalance the amplifier.

As a convenient expedient for avoiding these difficulties, an alternating source of light is caused to be projected upon the photoelectric cell. Alternation of the light source may be accomplished by pulsations of the source of energy to the illuminant, or by employing a gaseous discharge device such as a Geissler tube, as well as in other ways known in the art. In the present example, this alternating light is produced by rotating a sectored disc, such as 15, in the beam of light falling on the cell. The present preference is to dispose the disc substantially as appears in Fig. 1, arrangement for rotation thereof being found in a motor 16 which may be connected in any suitable manner to the disc. The rotation of the sectored disc at substantial speed, causes an alternating current to flow in the photoelectric cell circuit. This current is caused to flow through a high resistance, indicated diagrammatically at 17, and the voltage drop across which may be impressed upon a conventional or any suitable type of alternating current amplifier, hereinafter described. This amplifier is exceeding stable, and requires no accurate adjustment of the filament temperature or plate voltage. It will appear that the output of the amplifier is characterized by an alternating voltage, which is then impressed preferably upon a vacuum tube volt meter, identified in the present example as the meter 13, and which may be of any one of several well known types, such instruments depending upon the rectifying properties of the vacuum tube.

According to present preference and as illustrated in the diagram of Fig. 2, it will appear that the amplifying portion of the circuit from the photoelectric cell to the meter 13, consists of two transformer-coupled stages identified respectively with thermionic tubes 18 and 19, and transformers 20 and 21; suitable sources of filament and plate current being indicated by reference letters corresponding to conventional representations of these sources in the radio art. As diagrammatically representative of the vacuum tube volt meter, this instrument is shown as including a tube 22, fixed resistance 23, a variable resistance 24, together with the indicating device 13 and suitable current sources indicated conventionally as batteries.

Due to the great number of different arrangements which might be obtained with respect to the different items of apparatus appearing in Fig. 1, the showing thereof is more or less diagrammatic. It will, however, appear as obvious to those skilled in the art that it is a matter of design whether the rest or support 8 associated with the material under test, be made vertically adjustable so as to subject different portions of the substance in any desired order to the light rays between the prisms 6 and 11. It is also within the intendment of the invention and contemplated as within the scope thereof, so to construct the portion 8 that different articles under test may successively move, for example, transversely of the path of the light rays, and so the different articles successively subjected to tests, without any manual removal or insertion thereof. It is contemplated that the portion 8 may, in practice, consist of a movable conveyor serving to bring the different articles in order, to the position of test.

With respect to the meter 13, it is obvious that this may not consist merely of a visual indicating meter provided with a numerically graduated dial, but may consist of a recording instrument, and may further be associated with remotely energized apparatus (not shown) for removing defective articles under test if and when such articles are brought into the path of polarized light.

It will appear to those skilled in the art that the apparatus of the present invention is by no means limited in its application to the particular use set forth, but is capable of various applications. The description being illustrative and not of a limiting nature, the parts of the apparatus, their arrangement and combinations may be substantially altered and still fall within the full intendment and scope of the invention as defined by the appended claims.

We claim as our invention:

1. In a device for determining the polarization effect of strains in a translucent substance such as a glass object, a source of light, a prism for transmitting polarized light from said source through the substance under test, an analyzing prism exposed to the transmitted light a photoelectric cell beyond the analyzing prism, a meter for indicating the output of the photoelectric cell, a light-interrupter element rotatably mounted between the light source and polarizing prism, a base for supporting the light source, prisms and cell in predetermined aligned relation, and a support for the objects under test, disposed intermediate the ends of said base, forming a passage for such objects, transverse of the base and between the prisms.

2. In a device for testing objects of glass and like materials, a pair of enclosed, aligned, relatively rotatable light polarizing elements, spaced to provide a transverse passage between them for the objects under test, a support for the objects under test, forming the bottom of said passage, a light source, arranged for the projection of light through said elements and objects under test, a photoelectric device in the path of the projected light, a meter in circuit relation with the photoelectric device, a tubular enclosure for one polarizing element, disposed between the light source and said passage, lenses near the ends of said enclosure, an apertured light-interrupting disc extended peripherally into said tube, and means externally of said tube, for rotating said disc.

3. In a device for indicating strains in glassware, a source of light, a light-polarizing prism in the path of illumination from said source, an enclosing tube for said polarizing prism, lenses near opposite ends of said tube, an analyzing prism, a tube enclosing the analyzing prism to keep it physically aligned with said polarizing prism and arranged for rotational adjustment relative thereto, said tubes being spaced endwise of each other to provide a passage for solid objects under test, transversely of the axes of the tubes, a support at the bottom of said passage, for the article under test, disposed between said prisms and the tubes therefor, a photoelectric cell disposed beyond said analyzing prism, an enclosure therefor, provided with a light aperture adjacent the tube for the analyzing prism, light interrupting means consisting of an apertured disc rotatably disposed in the path of illumination between said light source and said cell, amplifying means in circuit relation with said cell, and a galvanometer in circuit relation with said cell and amplifying means.

4. In a device for testing glass and like materials, a pair of spaced, relatively rotatable light polarizing prisms, aligned tubular enclosures for the prisms, spaced to receive between them the object under test, an enclosed light source adjacent the first of said enclosures, arranged for the projection of light through said prisms and material, a support and a passage for solid objects to be tested, arranged transversely of the axes of the enclosures, a photoelectric cell aligned with the prisms and enclosures in the path of the projected light, means operable within one of said enclosures for periodically interrupting the light projected to the photoelectric cell, and a meter providing a numerical indication of the output of said device.

ROY S. GLASGOW.
ALEXANDER L. DUVAL D'ADRIAN.